April 4, 1939.   C. E. PERKINS   2,153,389
RAILWAY CAR SWAY CONTROL MECHANISM
Filed Oct. 11, 1937   2 Sheets-Sheet 1
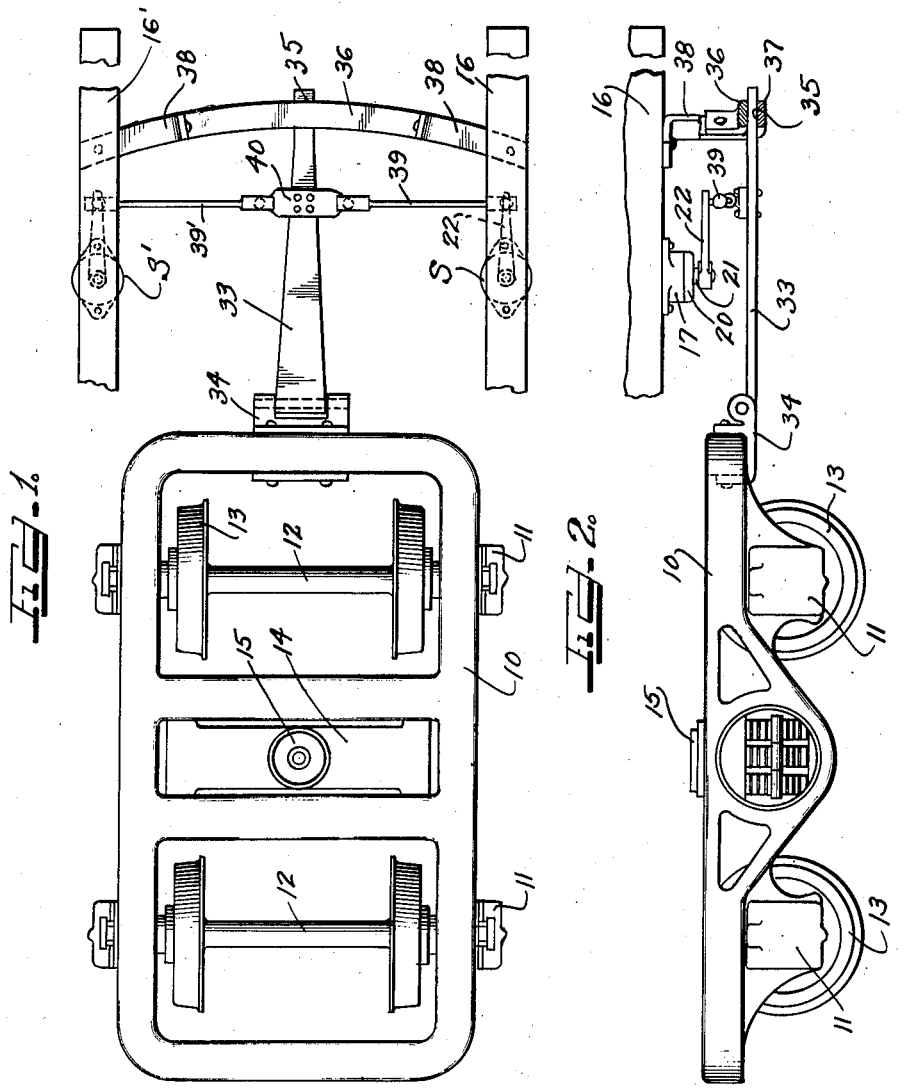
Inventor
CHARLES E. PERKINS.
by Charles Hill
Attys.

April 4, 1939.                C. E. PERKINS                2,153,389
                    RAILWAY CAR SWAY CONTROL MECHANISM
                    Filed Oct. 11, 1937         2 Sheets-Sheet 2
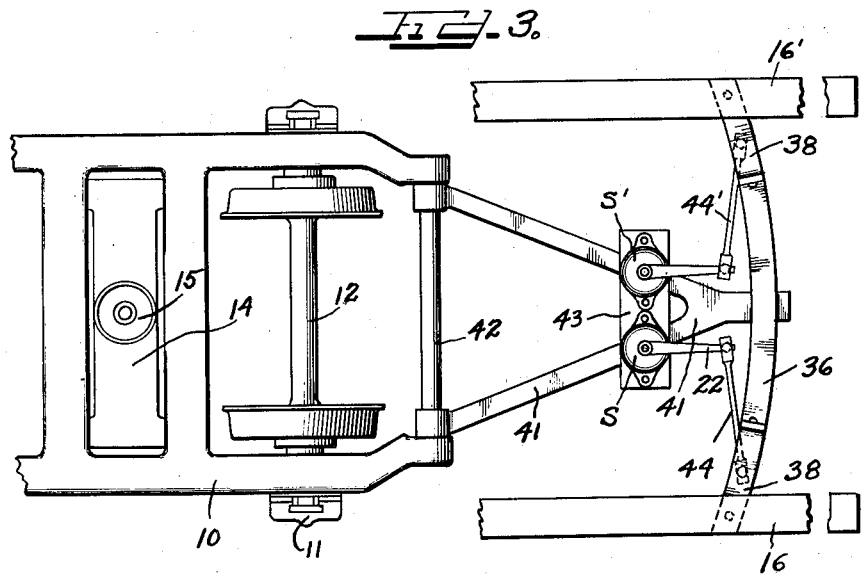
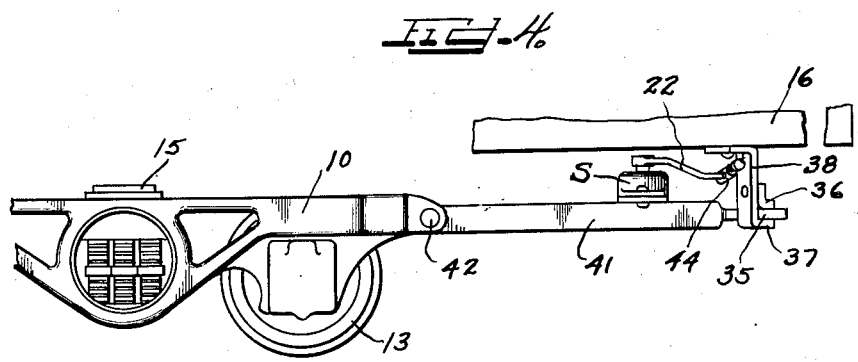
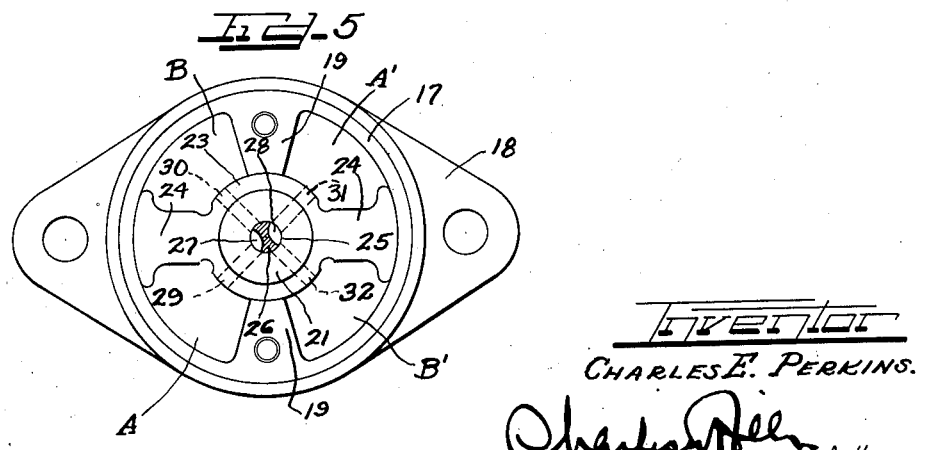
Inventor
CHARLES E. PERKINS.
by Charles Allen
Attys Patented Apr. 4, 1939

2,153,389

UNITED STATES PATENT OFFICE 2,153,389

RAILWAY CAR SWAY CONTROL MECHANISM

Charles E. Perkins, Buffalo, N. Y., assignor to Houde Engineering Corporation, Buffalo, N. Y., a corporation of New York Application October 11, 1937, Serial No. 168,380

1 Claim. (Cl. 105—199)

This invention relates to mechanism for dampening and minimizing the lateral or side sway of railway cars, particularly when such cars are traveling at comparatively high speeds.

It is generally known that the chief cause of lateral sway in cars of railway trains is due principally to the nosing of the trucks. This nosing condition arises from several causes, such as irregularity in the rails, concave wear in the tire of the wheels, and high or low spots on the rails, such nosing motion being communicated by the truck pivots to the car bodies whose inertia will then add to the nosing force of the trucks so that, as the trucks are viciously kicked back by the rails, a harmonic side sway develops which results in very disagreeable riding conditions.

The nosing characteristic is particularly noticeable on the rear truck of the last car, or perhaps the last several cars on a train, more so than at the forward end of the train. This is due to the whipping action of the train, especially at high speeds and around curves. When the car body lurches severely from side to side, the truck noses and the wheel flanges are slammed against the rail and to be recoiled by the rail so that the truck will tend to nose continuously from one side to the other with corresponding aggravation of the body side sway, and many methods have been tried to control and dispel this disagreeable riding condition.

An important object of the invention is to provide simple and efficient means for dampening and minimizing abrupt relative lateral movement of the trucks and the car body to eliminate the disagreeable riding condition, with the arrangement such that abrupt relative movement will be yieldably resisted but without interfering with the proper and safe cooperation of the truck with the rails, and with the operation such that when a train is traveling along a track and enters a curve, the body of the car entering the curve will guide the truck of the next car for easy turning of the curve. I preferably accomplish these results by the use of dampening structure such as hydraulic shock absorber structures suitably located and connected between the ends of a truck and the adjacent part of the car body mounted on the truck.

The various features of application and operation of my invention are incorporated in the structure shown on the accompanying drawings, in which drawings:

Figure 1 shows more or less diagrammatically a plan view of a car truck and part of the car body structure and with interposed shock absorber structure;

Figure 2 is a side elevation of the structure shown in Figure 1;

Figure 3 is a view similar to Figure 1 showing a modified arrangement;

Figure 4 is a side elevation of the structure shown in Figure 3; and

Figure 5 shows the inside of a hydraulic shock absorber which may be utilized for my invention.

Referring to Figure 1, the truck shown has the rectangular body 10 supporting journal boxes 11 for the axles 12 having the wheels 13, the truck mounting a bolster 14 for support of the bolster or pivot pin 15 by which the truck is pivoted to the car body, of which car body are shown only the side sills or beams 16 and 16'.

In order to dampen and control the lateral swing or rotation of the truck relative to the car body, I provide connection between the truck structure and the body, which connection includes a suitable dampening or motion controlling device. As shown, I have employed hydraulic shock absorber structure S which may be of the rotary type similar to the shock absorbers used on automotive vehicles for controlling the vehicle spring action. A shock absorber of this type is shown on Figure 5. Briefly, this structure comprises a circular housing 17 having wings 18 whereby it may be secured to a support, the housing having radially extending opposite partition walls 19. The housing is closed at its outer end by a cover 20 (Figure 2), and this cover structure and the housing base journal a shaft 21, on the outer end of which a lever arm 22 is secured (Figure 2). Within the housing the shaft 21 terminates in the cylindrical hub 23 which has bearing engagement with the inner faces of the partition walls 19, the hub having oppositely extending vanes 24, the vanes, the partitions and the hub dividing the cylindrical space within the housing into the diagonally opposite hydraulic working chambers A—A' and the diagonally opposite working chambers B—B'.

The shaft and the hub have a bore extending therethrough which within the hub forms a valve chamber 25 for a valve 26 which at its opposite sides has the ports 27 and 28. Radial passageways 29 and 30 through the hub connect the chambers A and B respectively with the valve chamber 25, and similar passageways 31 and 32 connect the chambers A' and B' respectively with the valve chamber 25, the valve port 27 connecting the inner ends of the passages 29 and 30 and determining the rate of flow of the hydraulic fluid between the chambers A and B, while the valve port 29 similarly controls the flow between the chambers A' and B', such chamber interflow resulting when the piston structure, comprising the hub and the vanes 24, oscillates within the housing 17, such operation being well understood in the art. The valve will, of course, be adjustable so that the rate of hydraulic fluid flow and consequently the damping characteristics of the shock absorber can be predetermined.

As shown in Figures 1 and 2, shock absorbers S—S' are mounted on the opposite car sills near the front end thereof and outwardly of the adjacent ends of the corresponding trucks, for connection of the shock absorber levers 22 with the truck structure. In order to increase the length of the arc of lateral swing of the truck for operation of the shock absorbers through their full range, a tongue structure 33 is extended from the truck frame and the shock absorber arms connected with the tongue. Figures 1 and 2 show a plain tongue 33 hinged to a bracket 34 secured to the middle of the front cross wall of the truck frame, the hinge connection permitting free vertical swing or oscillation of the truck. At its outer end the tongue is guided in the guideway 35 formed between the upper and lower walls 36 and 37 of a bracket structure 38 secured to and extending between the sills 16 and 16'. The shock absorbers S—S' are inwardly of the bracket structure 38 with their arms 22 extending normally forwardly, links 39 and 39' connecting the respective arms to a plate 40 secured to the tongue. Normally, that is when the longitudinal axis of the truck coincides with the longitudinal axis of the car body, the shock absorber arms extend forwardly and the tongue end is midway between the sills, as shown by Figure 1.

In the modified arrangement of Figures 3 and 4, a V- or wishbone-shaped tongue structure 41 is provided, hinged at the ends of its legs to the truck frame by means of a rod 42 extending between the truck frame side walls at the outer ends thereof. A bracket structure 38, similar to that shown in Figures 1 and 2, is provided between the sills 16 and 16'. Shock absorbers S and S' are mounted on a plate 43 secured on the tongue structure 41 near the outer end thereof, the shock absorber arms being connected to links 44 and 44' which are pivoted at their outer ends to the corresponding ends of the bracket structure 38, the shock absorber arms normally extending forwardly and the tongue end being at the center of the bracket structure.

With shock absorbers applied as shown, it is evident that any tendency to violent relative lateral movement of the truck and the car body will be yieldably resisted by the shock absorbers, the degree of resistance or dampening depending upon the setting of the shock absorber valves. Where two shock absorbers are used, the valve setting is the same in each, and the setting is preferably such that for comparatively slow relative lateral movement of the truck and car body, the valve port openings will permit flow between the shock absorber working chambers without any appreciable resistance to such relative movement, but for more violent relative movement, the valve port passageways will retard the flow of fluid between the shock absorber chambers and so correspondingly dampen and cushion the relative movement, and in this manner a truck, tending to violently nose or side sway, will be yieldably restrained and quieted down. Thus, when a train is traveling at high speed over track imperfections, track special work, or around curves, and the trucks tend to nose and the car bodies tend to side sway or lurch, the shock absorber structures will quiet down such movement so that the train will travel more smoothly without discomfort to the passengers.

On curves, when a car body starts to move in the direction of the curves, the shock absorbers will gently draw the front end of the truck in the same direction, and thus prepare the wheels for the curves and prevent violent contacts of the wheel flanges with the rails when coming into the curves. The damping action of the shock absorbers, while preventing violent nosing of the trucks and side swaying of the bodies, will not interfere with the slow or normal movements of the trucks.

I have thus produced simple and efficient means for minimizing nosing and side sway for making train riding more agreeable, as well as minimizing wear and tear caused by such action on both passenger cars and freight cars. I have shown and described practical and efficient embodiments of my invention, but I do not desire to be limited thereto, as changes and modifications may be made without departing from the scope and spirit of the invention.

I claim as follows:

In a railway car comprising a body structure and a truck structure pivoted thereto, a tongue hinged to one end of the truck for vertical swing and extending outwardly from the truck, a supporting bar on the body structure along which the outer end of the tongue may travel during lateral oscillation of the truck relative to the body structure, and linkage connecting the tongue end with the body structure and including hydraulic shock absorber mechanism functioning to dampen the relative lateral swing of the body structure and truck, the hinged connection of said tongue with the truck permitting vertical oscillation of the truck.

CHARLES E. PERKINS.